(12) United States Patent
Andonov et al.

(10) Patent No.: US 7,184,400 B2
(45) Date of Patent: Feb. 27, 2007

(54) APPARATUS AND METHOD FOR MEDIA PARAMETERS SELECTION BASED ON NETWORK AND HOST CONDITIONS

(75) Inventors: Emil Andonov, Rockdale (AU); Peter Donald Runcie, Bilgola Plateau (AU); Mark Harald Wutzke, Drummoyne (AU)

(73) Assignee: Avaya Technology Corp., Basking Ridge, NJ (US)

( * ) Notice: Subject to any disclaimer, the term of this patent is extended or adjusted under 35 U.S.C. 154(b) by 1023 days.

(21) Appl. No.: 10/172,212

(22) Filed: Jun. 14, 2002

(65) Prior Publication Data

US 2003/0231591 A1    Dec. 18, 2003

(51) Int. Cl.
*H04J 3/14*    (2006.01)
*H04L 12/28*   (2006.01)

(52) U.S. Cl. .................. 370/230.1; 370/235; 370/252

(58) Field of Classification Search ................. None
See application file for complete search history.

(56) References Cited

U.S. PATENT DOCUMENTS

| | | | |
|---|---|---|---|
| 6,101,626 A * | 8/2000 | Morelos-Zaragoza et al. | ... 714/786 |
| 6,529,475 B1 * | 3/2003 | Wan et al. | ................... 370/231 |
| 6,611,674 B1 * | 8/2003 | Jokimies et al. | .............. 455/69 |
| 6,907,000 B1 * | 6/2005 | Host | .......................... 370/228 |
| 7,002,992 B1 * | 2/2006 | Shaffer et al. | .............. 370/468 |
| 7,020,263 B2 * | 3/2006 | Bauer et al. | ................. 379/219 |

* cited by examiner

*Primary Examiner*—Doris H. To
*Assistant Examiner*—Soon D. Hyun
(74) *Attorney, Agent, or Firm*—John C. Moran

(57) ABSTRACT

Monitoring conditions within a switching network interconnecting two host systems engaged in a media call and adjusting the media parameters used by the host systems to improve call conditions.

15 Claims, 4 Drawing Sheets

APPARATUS AND METHOD FOR MEDIA PARAMETERS SELECTION BASED ON NETWORK AND HOST CONDITIONS

TECHNICAL FIELD

This invention relates to communications systems and, in particular, to the transmission of media information through a switching network.

BACKGROUND OF THE INVENTION

The use of packet switching networks to transport media information, such as human voice and video, suffers from a number of well known problems introduced by the packet network itself, as well as, by a host system that is executing the media processing application. (Within the prior art, the media processing application is also referred to as a VoIP application, VoIP End-Point, Packet End-Point, IP Telephone, or Soft Phone, etc.) This means that media quality of calls will vary greatly as different conditions effect the network and the host system.

SUMMARY OF THE INVENTION

The aforementioned problems are solved and a technical advance is achieved in the art by an apparatus and method that monitors conditions within a switching network interconnecting host systems engaged in a media call and adjusts the media parameters within the host systems to improve call conditions.

DETAILED DESCRIPTION

Figure 1:
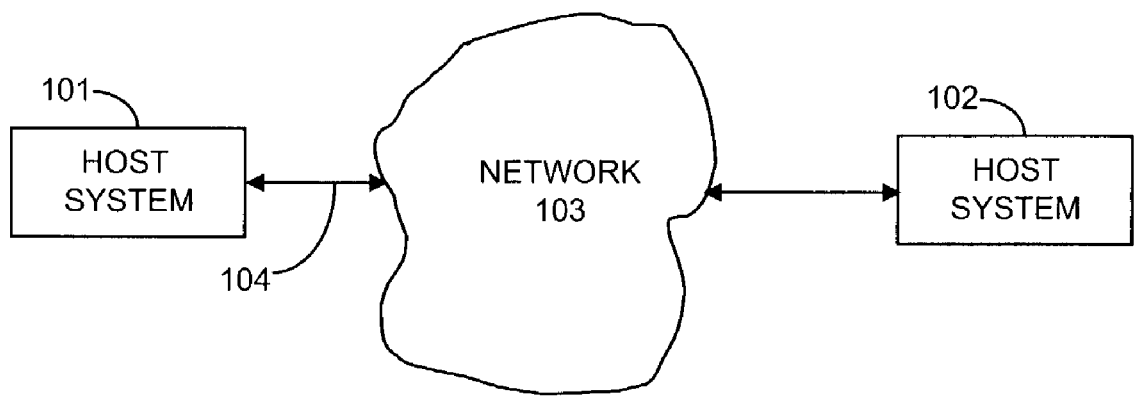
FIG. 1 illustrates, in block diagram form, an embodiment for implementing the invention.

FIG. 1 illustrates two host systems 101 and 102 that are running applications to provide media call operations via network 103. The media information transferred between host system 101 and 102 may be voice over IP, video plus voice or other packet switching techniques that are well known to those skilled in the art. Advantageously, network 103 may be the Internet, Intranet, wide area network (WAN), or ATM switching network. One skilled in the art would readily realize that network 103 could be composed of other elements and implement other network protocols.

In one embodiment of the invention, once the call is established between host system 101 and host system 102, host system 101 monitors the resources being utilized by the media processing application executing on the host system in comparison to the total utilization of host system 101. In addition, host system monitors the quality of packet transmission through network 103 to host system 102 with respect to quality of the media information. If packets containing media information are being lost or substantially delayed within network 103 before reaching host system 102, host system 101 may utilize a higher compression media processing application for transmitting media information to host system 102. The higher compression media processing application will implement a coder/decoder algorithm that reduces the number of bits needed to transmit the media information. Before switching to a higher compression media processing application, host system 101 will negotiate with host system 102 to ascertain that host system 102 can implement this new media processing application. In addition, host system 101 and host system 102 continue to use the original media processing application until the new media processing application is fully operational so that there is no interruption in the media communication between host system 101 and host system 102.

Host system 101 monitors the quality of transmission through network 103 by utilizing information that is returned to host system 101 on the quality of media packets received by host system 102 via control packets received back from host system 102 utilizing the Real Time Control Protocol (RTCP). Also, host system 101 may monitor network 103 by interrogating the different switching elements within network 103 to determine the delay that is being experienced in these switching elements.

In addition to monitoring the performance of network 103, host system 101 also monitors the utilization of processing and memory resources of host system 101. If the media processing application is utilizing more than a predefined amount of the processing or memory capacity of host system 101, host system 101 may reduce the level of processing and memory required to implement the media processing application. This reduction in resources being utilized by the media processing application executing on host system 101 is performed by utilizing a lower compression algorithm that requires more data transmission bits but is less computational intense. In addition, host system 101 can change the non-compression media operations so that these also are less computational intense. The non-compression media operations that can be adjusted by host system 101 are, for example, automatic gain control or level of filtering that is applied to media information being received from a user before compression, and use or non-use of echo cancellers for voice information.

Figure 2:
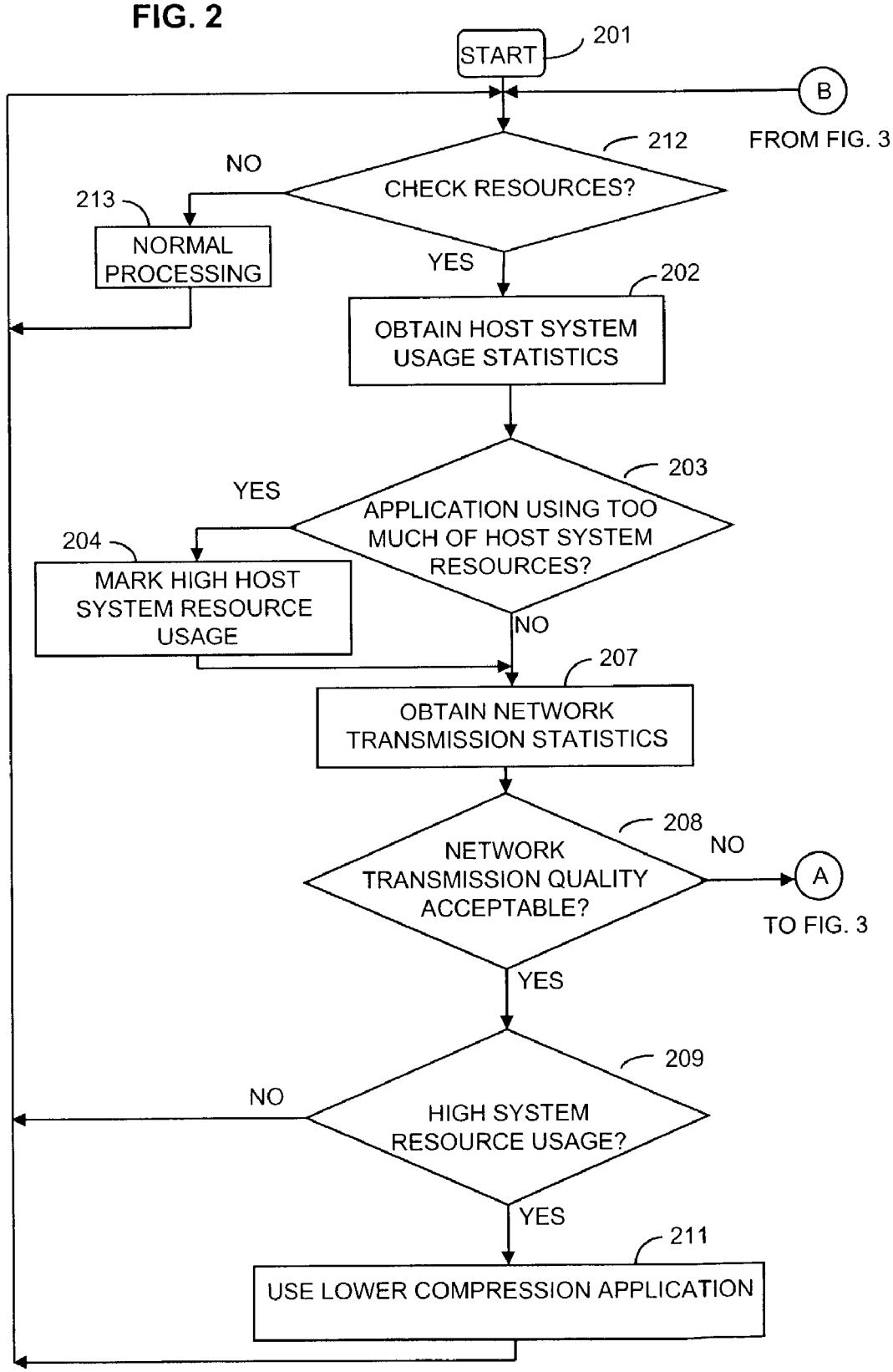
FIGS. 2 and 3 illustrate, in flowchart form, operations performed by one embodiment of a host system in implementing the invention.
Figure 3:
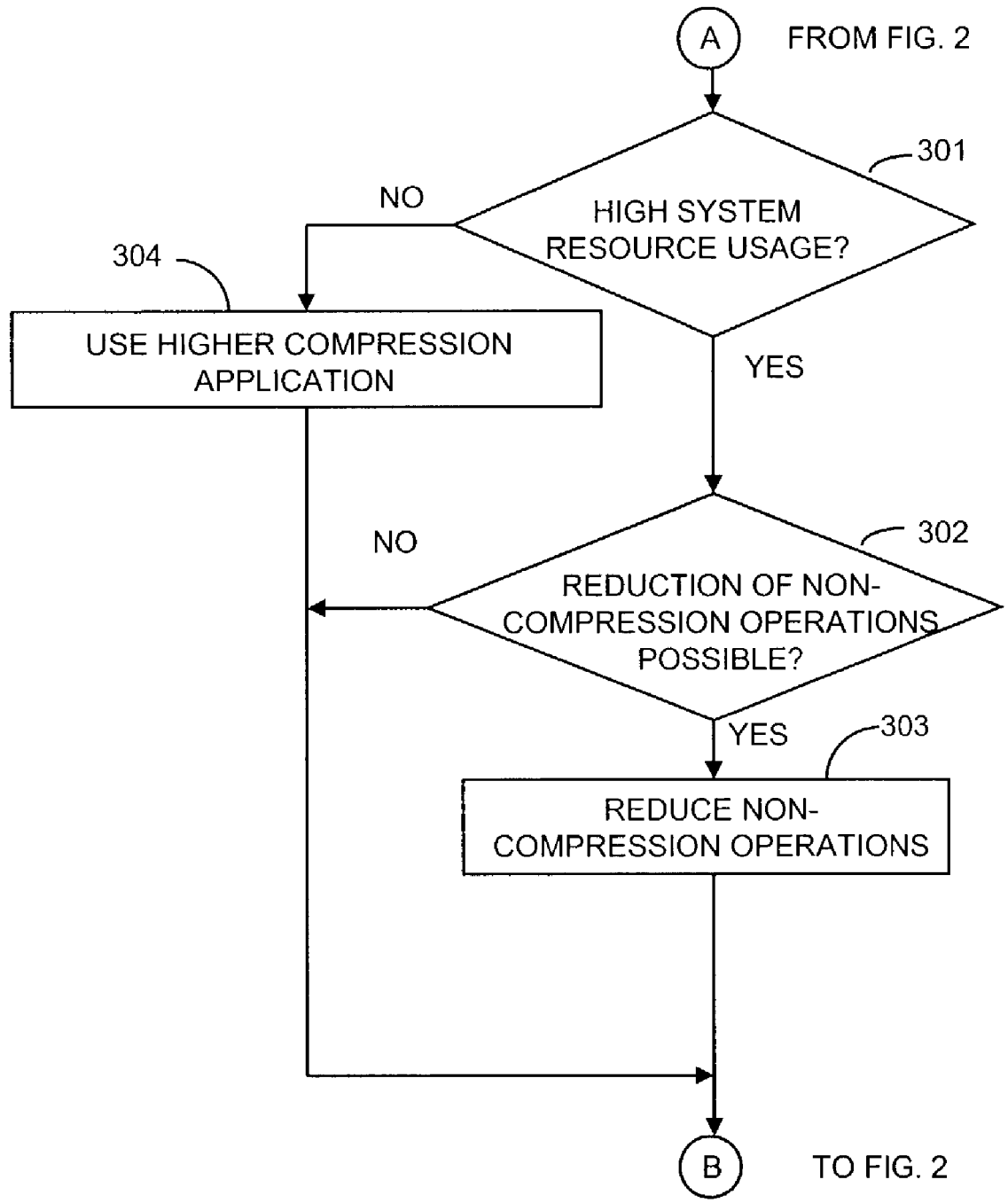

FIGS. 2 and 3 illustrate in flowchart form, operations performed by a host system. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 2 and 3 or may include additional functions without departing significantly from the functionality of an embodiment of the invention. For example, two blocks shown in succession in FIGS. 2 and 3 may in fact be executed substantially concurrently, the blocks may sometimes be executed in the reverse order, or some of the blocks may not be executed in all instances, depending upon the functionality involved, as will be further clarified below. All such modifications and variations are intended to be included herein within the scope of this disclosure and to be protected by the accompanying claims.

After being started by block 201 of FIG. 2, decision block 212 determines if it is necessary to check operations of the media processing application. This determination can be periodically performed or may be the result of a stimulus from another application or device. If the answer in decision block 212 is no, control is transferred to block 213 that performs normal processing before returning control to block 212.

If the answer in decision block 212 is yes, block 202 obtains the host system usage statistics. Decision block 203 then utilizes these usage statistics to determine if the media processing application is utilizing more than a predefined amount of the host system resources. If the answer is yes, block 204 marks the host system resources usage as high and transfers control to block 207.

If the answer in decision block 203 is no, control is also transferred to block 207. Block 207 obtains the network transmission statistics both by utilizing information returned to the host system from the destination host system via RTCP packets, and also, it may receive information by interrogating directly the switching elements of network 103. Block 208 then determines if the network transmission quality is acceptable. If the answer is yes, decision block 209 determines if the host system resource usage is high. If the answer is no, control is transferred back to block 212.

If the answer is yes in decision block 209, block 211 institutes the use of a lower compression rate media processing application before transferring control back to block 212. Note, that block 211 negotiates the use of this lower compression rate media processing application with the destination host system and maintains the use of the original media processing application until the new compression media processing application is operational. After the new compression media processing application is operational, the original compression media processing application is abandoned. Returning to decision block 208. If the network transmission quality is not acceptable, control is transferred to decision block 301 of FIG. 3.

Decision block 301 determines if the host system resource usage is high for the media processing application, if the answer is no, block 304 institutes the use of a higher compression media processing application after negotiation with the destination host system and the establishment of the parallel call before the original compression media processing application is abandoned. After execution of block 304, control is transferred back to block 202 of FIG. 2. If the answer in decision block 301 is yes, decision block 302 determines if it is possible to reduce the non-compression operations. The reduction of these operations will always be performed if they have not been already reduced. If it is possible, block 303 reduces or eliminates one of the non-compression operations before transferring control back to block 202 of FIG. 2. The determination is not made at this time to use of a higher compression media processing application because sufficient resources may not have been made available by the execution of block 303. If sufficient resources are available, a higher compression media processing application will be used on the next execution of decision block 301.

Figure 4:
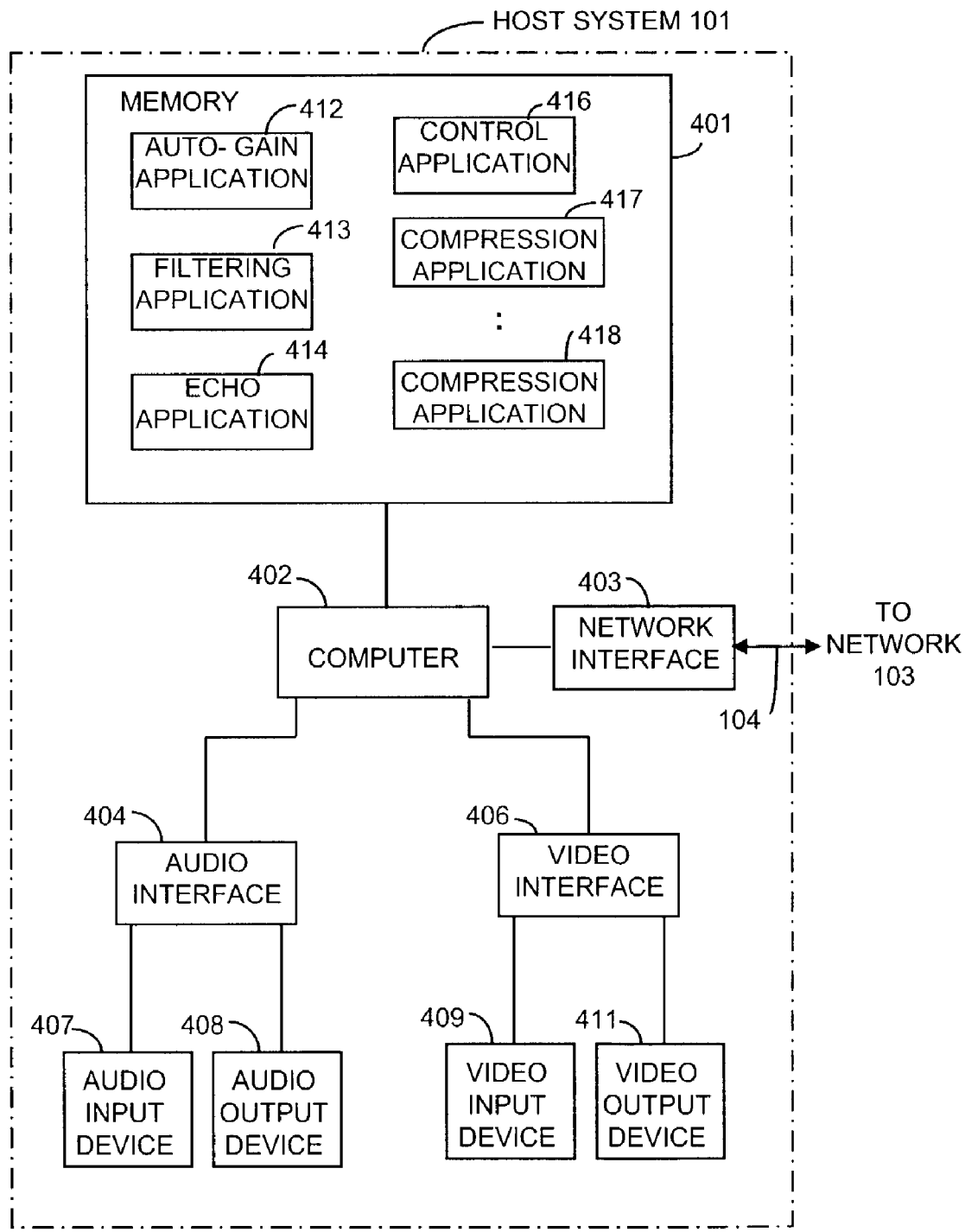
FIG. 4 illustrate, in block diagram form, an embodiment of a host computer system.

FIG. 4 illustrates, in block diagram form, an embodiment of host system 101. Overall control of host system 101 is provided by computer 402 executing the different application programs stored in memory 401. Computer 402 also stores variables and constants into memory 401.

Audio interface 404 provides an interface with audio input device 407 and audio output device 408 to computer 402. Similarly, video interface 406 provides an interface with video input device 409 and video output device 411 to computer 402. In an embodiment of the invention, computer 402 executes applications 412–418 to perform the operations illustrated in FIGS. 2 and 3.

Control application 416 provides the overall control of host system 101 when executed by computer 402. Compression applications 417–418 are a number of compression applications each implementing a different coder/decoder algorithm to the media information. Since a different coder/decoder algorithm is utilized by each of the compression applications, different levels of compression are achieved on the media information being transmitted and received via network interface 403 to/from network 103.

In addition, computer 402 executes auto-gain application 412 to provide automatic gain control over information being received from interfaces 404 and 406. Similarly, filtering application 413 is utilized to provide filtering of information being received from interfaces 404 and 406. Echo application 414 provides echo cancellation for audio information being received from audio input device 407.

The operations of host system can be implemented in software, hardware, or a combination thereof. In the currently contemplated best mode, the operations of the host system of FIG. 4 are implemented in software, as an executable program, that is executed by computer 402. Computer 402 is a hardware device for executing software, particularly that stored in memory 401. Computer 402 can be any custom made or commercially available processor.

The memory 401 can include any one or combination of volatile memory elements (e.g., random access memory (RAM, such as DRAM, SRAM, SDRAM, etc.) and non-volatile memory elements (e.g., ROM, hard drive, tape, CDROM, etc.). Moreover, the memory 401 may incorporate electronic, magnetic, optical, and/or other types of storage media. Note that the memory 401 can have a distributed architecture, where various components are situated remote from one another, but can be accessed by 402.

When the operations of the host system are implemented in software, as is shown in FIG. 4, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The host system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In an alternative embodiment, where the host system is implemented in hardware, the host system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A method for selection of media parameters for a media call, comprising the steps of
   monitoring quality of packet transmission communicating media information between endpoints of the call with the media information being encoded by a first compression application wherein one of the endpoints is a first host computer system;
   detecting if the quality of packet transmission is below a first predefined level;
   replacing the first compression application with a higher compression application to encode the media information for the packet transmission upon the quality of the packet transmission being below the first predefined level;
   monitoring an amount of resources of the first host computer system used by the compression application;
   detecting if use of the resources of the first host computer system by the compression application is a higher than a second predefined level; and
   replacing the first compression application with a lower compression application to encode the media information for the packet transmission upon the use of resources being higher than the second predefined level.

2. The method of claim 1 wherein the other one of the endpoints is a second host computer system and the step of replacing the first compression application with the lower compression application comprises the steps of maintaining the use of the first compression application during the step of replacing the first compression application with the lower compression application; and
   ceasing the operation of the first compression application upon the step of replacing the lower compression application being completed.

3. The method of claim 1 wherein the other one of the endpoints is a second host computer system and the step of replacing comprises the steps of maintaining the use of the first compression application during the step of replacing the first compression application with the higher compression application; and
   ceasing the operation of the first compression application upon the replacing step being completed.

4. The method of claim 1 wherein the step of monitoring quality of packet transmission comprises the steps of transmitting quality information by a second host computer system to first host computer system via control packets;
   utilizing quality information from the second host computer system by the first host computer system to monitor quality.

5. The method of claim 4 wherein the second host computer system uses the Real Time Control Protocol for transmission of quality information.

6. The method of claim 1 further comprises the step of ceasing to perform non-compression media operation upon the use of resources being higher than the second predefined level.

7. The method of claim 6 wherein the non-compression media operation is automatic gain control.

8. The method of claim 6 wherein the non-compression media operation is filtering.

9. The method of claim 6 wherein the non-compression media operation is echo control.

10. An apparatus for adjusting media parameters for media transmission between a first and second host computer systems via a switching network, comprising:
    a computer in the first host computer system executing a control application to determine if quality of the media transmission is below a first predefined level; and
    the computer executing a higher compression application to adjust the media parameters upon the quality of media transmission being below the first predefined level;
    the computer further executing the control application to determine if use of resources of the first host computer system by the compression application is higher than a second predefined level;
    the computer executing a lower compression application to adjust the media parameters upon the use of resources of the first host computer system being above the second predefined level.

11. The apparatus of claim 10 further comprises the computer ceasing to perform a non-compression media operation upon the use of resources being higher than the second predefined level.

12. The apparatus of claim 11 wherein the non-compression media operation is the computer executing an automatic gain control application.

13. The apparatus of claim 11 wherein the non-compression media operation is the computer executing a filtering application.

14. The apparatus of claim 11 wherein the non-compression media operation is the computer executing an echo cancellation application.

15. An apparatus for adjusting media parameters in packet transmission, comprising:
    means for receiving packet transmission quality information via control packets;
    means for initiating a higher compression application to encode and decode packets upon the quality information being below a first predefined level; and
    means for initiating a lower compression application to encode and decode packets upon use of resources of a host computer system by the compression application to the encode and decode packets being above a second predefined level.

* * * * *